219-121 SR

12/2/86 OR 4,626,648

United States Patent [19]

Browning

[11] Patent Number: 4,626,648

[45] Date of Patent: Dec. 2, 1986

[54] HYBRID NON-TRANSFERRED-ARC PLASMA TORCH SYSTEM AND METHOD OF OPERATING SAME

[76] Inventor: James A. Browning, P.O. Box 6, Hanover, N.H. 03755

[21] Appl. No.: 751,648

[22] Filed: Jul. 3, 1985

[51] Int. Cl.[4] .............................................. B23K 15/00

[52] U.S. Cl. ...................... 219/121 PY; 219/121 PR; 219/75; 219/121 PP

[58] Field of Search .................. 219/121 PC, 121 PR, 219/121 PP, 121 PM, 121 PN, 123, 75, 121 PQ; 313/231.31, 231.41

[56] References Cited

U.S. PATENT DOCUMENTS

| | | | |
|---|---|---|---|
| 3,304,774 | 2/1967 | Poole | 219/121 PR |
| 3,533,756 | 10/1970 | Houseman | 219/121 PM |
| 3,536,885 | 10/1970 | Mitchell | 219/121 PQ |
| 3,770,935 | 11/1973 | Tateno et al. | 219/121 PR |
| 4,125,754 | 11/1978 | Wasseman et al. | 219/121 PP |
| 4,439,657 | 3/1984 | Shimanovich et al. | 219/121 PR |

OTHER PUBLICATIONS

Metals Handbook, "Welding & Brazing", Copyright 1971, pp. 138–139.

*Primary Examiner*—M. H. Paschall
*Attorney, Agent, or Firm*—Sughrue, Mion, Zinn, Macpeak, and Seas

[57] ABSTRACT

A hybrid transferred-arc plasma torch system utilizes a transferred-arc plasma torch whose hollow body carries internally a cathode aligned with a relatively small diameter nozzle which functions under a created arc to issue an arc flame through the nozzle with a plasma gas applied to the chamber. An external anode electrically isolated from the cathode and the transferred-arc plasma torch body coaxial with the nozzle and spaced downstream thereof has an active anode surface of relatively large area radially remote from the axis of the arc flame issuing from the transferred-arc torch with the torch anode position such that the arc flame extends freely beyond the active anode surface with a reverse flow of electrons completing the circuit from the arc flame beyond the anode surface back to that anode surface.

4 Claims, 2 Drawing Figures

HYBRID NON-TRANSFERRED-ARC PLASMA TORCH SYSTEM AND METHOD OF OPERATING SAME

This invention relates to plasma-arc technology, and more particularly to a hybrid non-transferred-arc plasma torch and its method of operation.

BACKGROUND OF THE INVENTION

In the development of plasma-arc technology over the past twenty-five years, equipment improvements have made the transferred-arc torch designs much more reliable than their non-transferred-arc counterparts. This fact is particularly true when operating at high gas pressure, high arc column amperage, or both.

Transferred-arc plasma torches are most commonly used for metal cutting and welding. High reliability results from the anode electrode being exterior to the torch. The arc actually passes to the piece being cut or welded, and that piece or a component thereof functions as the anode in the arc process. The constructing nozzle functions simply as a passageway for the arc column. The additional anode heating is not superimposed on the constricting nozzle.

In contrast, in the non-transferred-arc torch, often used in flame spraying of metals and ceramics to form a coating, the plasma-directing nozzle must also serve as the anode electrode (assuming straight polarity). These plasma directing nozzles are easily overheated and fail much more frequently than where they are used in conjunction with a transferred-arc. Because of the weakness of the nozzle of the non-transferred design, small nozzle diameters required to produce high jet velocities are not commercially useful. On the other hand, transferred-arc apparatus for cutting metal frequently is designed to produce supersonic jet flows at high current flow.

It was noted that in observing a transferred-arc torch functioning to pierce a hole in a one-half inch thick steel plate, the arc column melts its way through the full thickness of the steel, first producing a small diameter hole. With continued arc heating and plasma scouring, the hole grew in diameter. When it reached about one-half inch diameter, the arc voltage requirement became so high that the power source could no longer provide it and the arc went out.

Based on this observation, it is an object of the present invention to combine the advantages of the transferred-arc torch with a novel anode spaced from or electrically isolated from the torch and its cathode, and spaced from but coaxial with the flow constricting nozzle associated with the transferred-arc torch, to permit the transferred-arc torch to function as a non-transferred-arc torch.

SUMMARY OF THE INVENTION

The present invention is directed to a hybrid non-transferred-arc plasma flame system comprising: a transferred-arc plasma torch; the torch including a cathode and having a relatively small diameter nozzle for issuing an arc flame axially of the nozzle; an electrically-isolated anode coaxial with the nozzle and including an active anode surface of relatively large area radially outwardly from the axis of the arc-flame issuing from the transferred-arc torch nozzle; and circuit means connecting the cathode and the anode and providing a potential difference therebetween. The torch and the anode are positioned such that the arc-flame extends beyond the active anode surface, and the circuit means includes means for insuring a reverse flow of electrodes to complete the circuit at the arc-flame.

The electrically isolated anode may comprise an annular member having a bore aligned with but of larger diameter than the bore of the transferred-arc torch nozzle, and wherein the arc-flame column through the anode bore is such that the anode bore constitutes an active anode face presenting an equipotential surface to the arc-flame.

The invention is further directed to a method of producing an arc-flame of high thermal density by producing a small diameter arc column through a short axial distance by setting up a small diameter arc column through a short axial distance within and projecting from a relatively small diameter nozzle passage of a transferred-arc plasma torch characterized by large voltage drop, and extending the arc column past an exterior or electrically isolated anode presenting a large active anode surface facing the arc-flame column downstream of the small diameter transferred-arc torch nozzle, such that the large active anode surface presents an equi-potential surface to the arc-flame.

DESCRIPTION OF THE PREFERRED EMBODIMENTS

Figure 1:
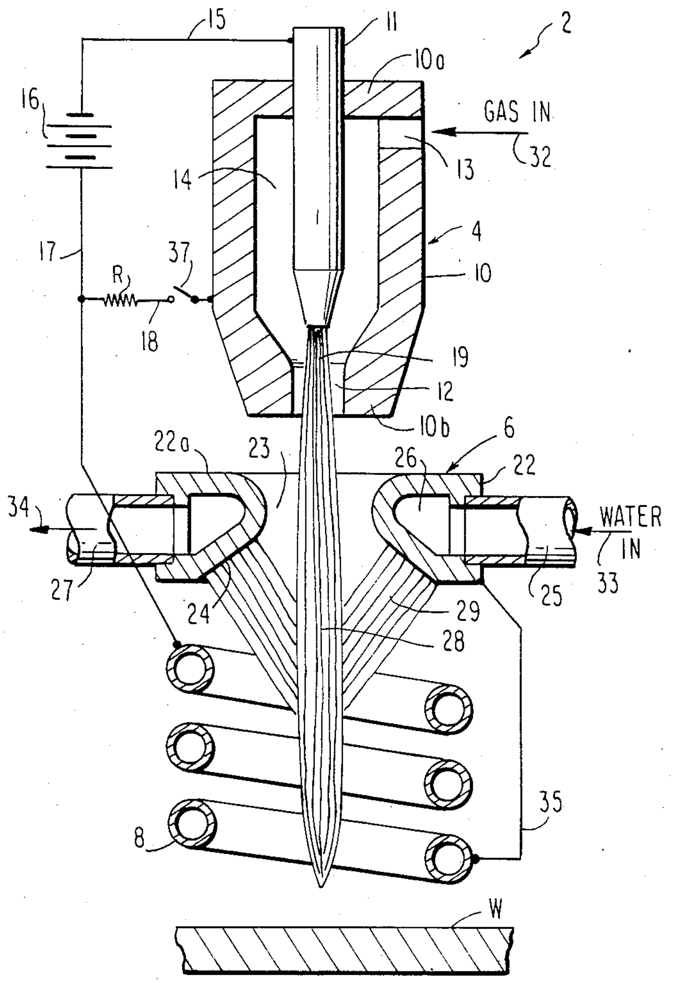
FIG. 1 is a schematic, sectional view of a hybrid transferred-arc plasma torch system employed in metal cutting and forming a preferred embodiment of the present invention.

As may be appreciated by viewing FIG. 1, the present invention combines the advantages of the transferred-arc plasma torch systems with a novel exterior anode or an anode which is electrically isolated from the cathode of the transferred plasma torch itself. The hybrid non-transferred-arc plasma torch system, indicated generally at 2, is constituted by a transferred-arc torch, indicated generally at 4, and an exterior anode is indicated generally at 6. The system composed of these two principal components allows transferred-arc equipment to function as a non-transferred-arc torch, and in essence, an intense arc column as at 19 issues from the transferred-arc torch 4 via a small nozzle bore 12 within a torch body indicated generally at 10.

As is noted, the exterior anode 6 is electrically isolated from the torch 4 and is of hollow, toroidal shape.

The transferred-arc torch 4 is comprised of torch body 10 of generally cylindrical form whose hollow interior bears a cylindrical cathode electrode 11 passing through end wall 10*a* and extending axially through the hollow interior to define an annular chamber or volume 14 between the cathode 11 and the cylindrical wall of the plasma torch body 10. the opposite end wall 10*b* is pierced by an exit bore nozzle 12 opening to chamber 14. Plasma forming gas as indicated by the arrow 32 is fed through passage 13 into the annular volume or chamber 14, and the gas exits from torch body 10 from chamber 14 through nozzle 12 together with arc column 19. As illustrated, as one example of the utility of the invention, the arc column 19 is directed against a metal work piece W to be cut.

It should be appreciated that the exterior anode 6 is purposely designed to have at or near its upstream face 22a a small diameter bore 23, followed by a generally expanding surface 24, the bore passage configuration formed by the anode 6 being of venturi shape. The toroidal body 22 forming the exterior anode 6, is purposely hollow and is formed of a highly heat conductive material such as copper and must be heavily cooled by a circulating fluid such as water. In the illustrated embodiment, a cooling stream of water is fed into the hollow interior or annular passage or annulus 26 of the toroidal body 22 via inlet tube 25 which opens directly into annulus 26 and which slidably pierces the sidewall 22b of the toroidal body 22.

Further, in the illustrated embodiment, a second tube 27 acts to discharge the water which flows through the system, as indicated by the arrows 33, 34. The outlet tube 27 is sealably mounted to be sidewall 22b of the toroidal body 22 diametrically opposite that of inlet tube 25 and opens to annulus 26.

To set up the arc, a voltage source, indicated schematically by battery 16, provides a high potential difference between the cathode 11 and the exterior anode 22 via lines 15 and 17 leading, respectively, to the cathode and anode. Further, a resistor R is provided within line 18 which connects the torch body 10 to the voltage source 26 via line 17. In operation, arc current temperatures of 300 amperes were reached under conditions where the upstream water pressure for the water flow 33 cooling the anode was at 180 psig. The arc column 19 struck at the cathode passes into and freely through the anode bore 23 to form an intensely bright narrow arc-flame 28. Ligaments 29 of the arc separate from the column 28 and move in a rearward direction to strike perpendicularly against the outwardly flared diverging anode surface 24. The active anode section is quite large and in the illustrated system, and for a one inch outer diameter under 300 ampere current conditions lasting one-half hour, little erosion of the anode metal was noted.

Further, arc anode spot(s) pass rapidly over this wide area distribute anode heating to a large volume of the highly cooled metal forming the anode 6.

The extremely hot plasma and gases forming the extended arc-flame 28 may be used for many applications in addition to flame cutting of the metal work piece W, as illustrated, normally accomplished using conventional non-transferred-arc equipment or systems. Generally, the arc-flame 28 produced by the apparatus and under the method of the present invention is much hotter than for conventional non-transferred-arc equipment. Gas flows may be reduced as fast momentum is no longer a prerequisite for prolonged anode-tube life. High voltages are possible using the small bore nozzle 12 of the transferred-arc torch 4. Thus, overall thermal efficiencies are quite high.

The use of the illustrated system 2 includes all non-transferred-arc heating applications including metal heat treating and hardening, flame spraying and even the efficient disposal of hazzardous waste. Other uses involve the cutting of electrically conductive materials, ceramics and plastics and gas welding of metal using a non-oxidizing flame.

Further, flame spraying of either powder or wire feeds may be effected using the apparatus shown and the methods described. The material may be introduced in this case directly into the nozzle 12 as in conventional plasma spray equipment, in the zone contained between the torch body 10 and the upper surface 22a of anode 6, or even into the arc-flame 28 beyond the lower face 24 of the anode 6.

For optimum performance, it is necessary that the electron flow to the anode 6 be from an arc-flame extending freely beyond the anode 6 itself, and that the shape of the active anode surface approximate as closely as possible a surface of equipotential to the arc column 19.

For yet increased anode life, the arc spot(s) are preferably rapidly rotated by the creation of a magnetic field. Such magnetic field is created by employing a hollow copper tube wound into several turns, as at 8, the tube being, for instance, 3/16 inch in diameter, and connecting the ends of the tube to the exterior anode 22 as by line 35, while the opposite end of the tube connects to line 17 to complete the circuit to source 16.

Line 18 includes a resistance R and a normally open switch 37 between the battery or voltage source 16 and cathode body 10. Switch 37 is momentarily closed during starting to insure creation of the initial arc. After several seconds, switch 37 is opened as shown and the arc continues and extends to and freely beyond the exterior anode 6.

In contrast to the prior transferred-arc plasma systems, the cathode 11 operates at high pressure but the anode operates at low pressure, thereby providing a long extension of the arc with an extremely high temperature flame. This is particularly advantageous since it provides an efficient means for disposal of hazzardous waste.

Figure 2:
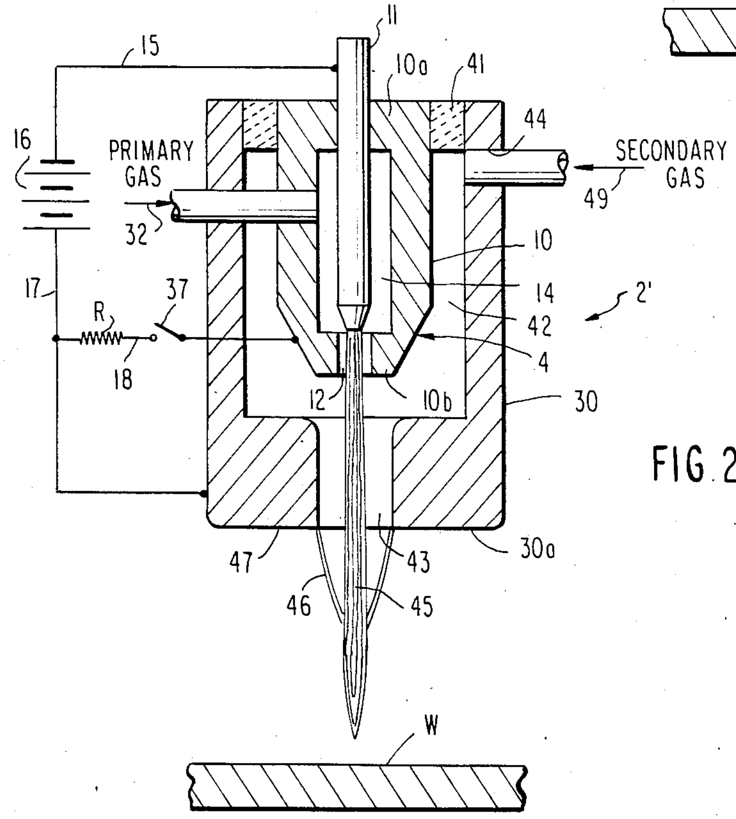
FIG. 2 is a schematic, sectional view of a hybrid transferred-arc plasma torch system forming a further embodiment of the present invention.

Referring next to FIG. 2, there is shown a second embodiment of the present invention. Like numerals are employed for like elements. However, there are some distinct differences in the structural make-up of this embodiment of the hybrid transferred-arc plasma torch system. The system, indicated generally at 2′, is constituted by a transferred-arc torch, indicated generally at 4, and an outer conducting shell 30 constituting an annular exterior anode corresponding to that at 6 in the embodiment of FIG. 1. The system composed of these two principal components again allows the transferred-arc equipment to function as a non-transferred arc torch and, in essence, again creates an intense arc column, as at 19, which issues from the transferred-arc torch 4 via a small nozzle bore 12 within the torch body 10. Torch body 10 may be identically formed to that of the first embodiment.

Contrary to the first embodiment, the outer conducting shell 30 is concentrically positioned around torch 4, is generally of cup-shape, formed of metal as is torch body 10, and being electrically isolated by an annular insulator piece 41 fitting between body 10 and the interior of the cup-shaped outer conducting shell 30 so as to create an annular cavity 42 between these two members, sealed off at one end by insulator piece 41.

In similar fashion to the embodiment of FIG. 1, torch body 10, which is of generally cylindrical form, has within its hollow interior a cylindrical cathode electrode 11 passing through end wall 10a and extending axially through the hollow interior to define an annular chamber or volume 14 between the cathode 11 and the cylindrical wall of the plasma torch body 10. The opposite end wall 10b of the torch body 10 is pierced by an exit bore nozzle 12 opening interiorly to chamber 14. Plasma forming gas as indicated by arrow 32, is fed through a tube 48 from the exterior of the outer conducting shell 30 with tube 48 terminating interiorly of body 10 and opening to chamber 14. this primary plasma forming gas exits from torch body 10 through nozzle 12 together with arc column 19 in the manner of the prior embodiment of FIG. 1. The arc column 19 is generally directed towards workpiece W to be flame cut. The cup-shaped, outer conducting shell 30 is provided with a transverse wall 30*a* which, in turn, is pierced by an outer conducting shell bore 43 coaxial with the exit bore nozzle 12 of torch body 10. It is noted that the torch body wall 10*b* is spaced some distance from transverse wall 30*a* of the outer conducting shell 30, and the diameter of the torch body 10 is significantly smaller than the inner diameter of the cup-shaped outer conducting shell 30 defining an initial annular cavity 42 extending towards the torch body wall 10*b* bearing exit nozzle bore 12.

Secondary gas, indicated by arrow 49, is fed through one or more radial passages 44 into the annular cavity 42 and the gas escapes from the interior of the outer conducting shell 30 via nozzle or bore 43 together with arc column 19. As such, the secondary gas 49 forms a sheath of non-ionized gas betwen the arc column 45 and the bore wall of nozzle 43. In accordance with the present invention, the outer conducting shell 30 constituting an exterior anode, functions to form a flat anode surface 47 defined by the exterior surface of transverse wall 30*a* about nozzle 43. The outer conducting shell 30 is preferably formed of a highly heat conductive material such as copper, and in accordance with the embodiment of FIG. 1, may be heavily cooled by a circulating fluid such as water. Purposely, this embodiment is illustrated in simplified form without the cooling system, but it may be fully equivalent to that shown in the embodiment of FIG. 1. In the manner of the first embodiment, to set up an arc, a voltage source, indicated schematically by battery 16, provides a high potential difference between the cathode 11 and the exterior anode formed by the outer conducting shell 30, via lines 17. Further, line 18, which branches from line 17 and connects to torch body 10, includes resistor R in series with a switch 37. Switch 37, again in the manner of the embodiment of FIG. 1, is momentarily closed during starting to insure creation of the initial arc. After several seconds, switch 37 is opened as shown, and the arc continues and extends to and beyond the anode surface 47. However, in this embodiment, the secondary gas forms the sheath of non-ionized gas between the arc column 35 and the bore wall of nozzle 33. The "cool" sheath constricts the arc 45 to a narrower diameter than for the case of FIG. 1. Voltage increases even when the secondary gas 49 is the same gas type as that employed as the primary gas 32 fed through tube 48 to chamber 14, for example, nitrogen. Substituting a different gas as the secondary gas 49 is possible. Switching to hydrogen or other hydrogen bearing gas such as propane and employing a further voltage increase, results in further arc constriction. The secondary gas 49 may also be a mixture of different gases such as hydrogen plus oxygen. These reactants may combine chemically to further increase heat output of the device.

The anode attachment region of the hybrid non-transferred-arc plasma torch system such as system 2 of FIG. 2 operating without a secondary gas flow, is diffuse in contrast to that of the embodiment of FIG. 2. In FIG. 2, with an adequate secondary gas flow 49, the anode ring area becomes much smaller and permits the use of a flat anode surface 47. As such, the reversed arc flow 46 impinges on a narrow ring about one-eighth of an inch wide surrounding the exit end of nozzle 33. In the illustrated embodiment, the nozzle 33 is positioned axially beyond the exit end of exit nozzle 12 of torch 11, spaced about one-eighth of an inch to one-quarter of an inch therefrom. As may be appreciated, the dimensional relationships may vary from those discussed in the description of the embodiment of FIG. 2.

While the invention has been particularly shown and described with reference to a preferred embodiment thereof, it will be understood by those skilled in the art that various changes in form and details may be made therein without departing from the spirit and scope of the invention.

What is claimed is:

1. A hybrid non-transferred-arc plasma torch system comprising:

a plasma torch, said torch including a plasma torch body, said body being hollow and having a chamber therein opening to the body exterior through a relatively small diameter nozzle, passage means for supplying a plasma gas to said chamber, a cathode carried by said plasma torch body coaxial with said nozzle and functioning under a created arc to issue an arc flame through the nozzle, an exterior anode electrically isolated from said cathode and the plasma torch body coaxial of said nozzle and spaced downstream therefrom, said exterior anode having a passage therethrough axially aligned with said nozzle and an active anode surface surrounding said passage of relatively large area radially remote from the axis of the arc flame issuing from said torch.

means for initially subjecting said cathode and said anode of said plasma torch body to a potential difference sufficient to create an arc therebetween, and for subsequently subjecting said cathode and said exterior anode to a potential difference to cause said arc to extend through said exterior anode passage, and wherein said torch and said anode are positioned such that said arc flame extends to and freely beyond the active anode surface such that a reverse flow of electrons completes the circuit from the arc flame beyond the anode surface back to said active anode surface, wherein said exterior anode comprises a cup-shaped member fixed to said torch body and extending axially beyond the body at said end bearing said nozzle to define a secondary gas chamber about the arc-flame exiting from the torch body nozzle and passing through said exterior anode passage, and means for supplying a secondary gas to said secondary gas chamber such that the secondary gas forms a sheath of non-ionized gas between the arc column and the wall of the exterior anode defining said passage therethrough, axially aligned with said torch body nozzle which functions to constrict the arc of said hybrid non-transferred-arc plasma torch system through said exterior anode passage and the portion of the arc which extends freely beyond the active anode surface.

2. The hybrid non-transferred-arc plasma system as claimed in claim 1, wherein said exterior anode comprises an outer conducting shell of cup-shaped configuration including an end wall bearing said passage axially aligned with the nozzle and spaced from said torch body bearing said nozzle, said cup-shaped outer conducting shell further comprising a cylindrical wall concentrically surrounding said torch body and being spaced radially therefrom, and wherein an annular insulator is interposed between said cylindrical wall and said torch body at the end of the torch body remote from said nozzle, and wherein said means for supplying a secondary gas to said secondary gas chamber comprises means for feeding secondary gas radially through said outer conducting shell cylindrical portion adjacent said annular insulator and remote from said transverse wall.

3. A method for producing an arc flame of high thermal content, said method comprising:

initially creating an arc flame within an arc torch body having a cathode and concentric cylindrical anode and discharging the arc-flame from a relatively small diameter nozzle passage contained in said arc torch body anode to produce a small diameter arc column through a relatively short axial distance characterized by a large voltage drop between said arc torch cathode and said torch body anode at said small diameter anode nozzle passage, and extending said arc column significantly by passing said arc-flame through the hollow interior of an electrically isolated anode downstream of said small diameter anode nozzle passage of said arc torch body, by providing a large active anode surface radially remote from the axis of the arc-flame issuing from the arc torch body anode and electrically isolated therefrom, causing said arc to transfer to said active anode surface from said torch body at said small diameter anode nozzle passage, such that a reverse flow of electrons completes the circuit through the arc-flame back to the active anode surface with said arc extending to and freely beyond said electrically isolate anode, discharging a secondary gas stream through the interior of the electrically isolated anode about the small diameter arc column created by the discharging arc flame from the relatively small diameter anode nozzle passage contained in the arc torch to constrict the arc column passing through said exterior anode and freely beyond the electrically isolated active anode surface.

4. The method as claimed in claim 3, wherein said step of discharging the secondary gas through the interior of the electrically isolated anode comprises discharging a mixture of different reactant gases which combine chemically to increase the heat output of the arc column.

* * * * *